(No Model.)
L. LUMIÉRE.
PHOTOGRAPHIC APPARATUS.
No. 444,535. Patented Jan. 13, 1891.
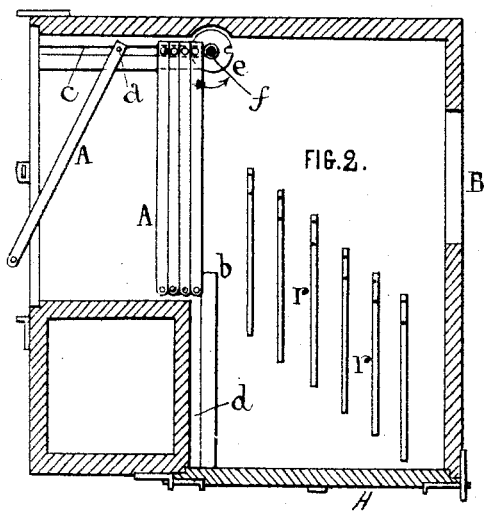
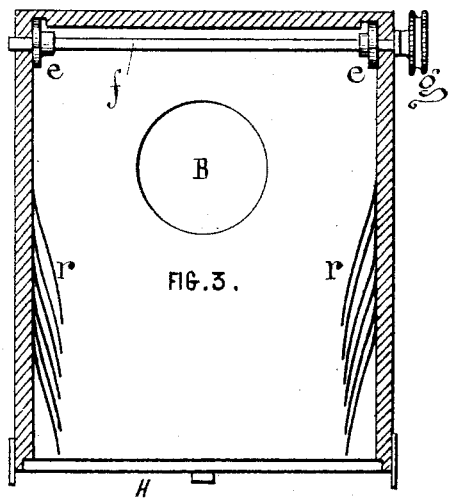
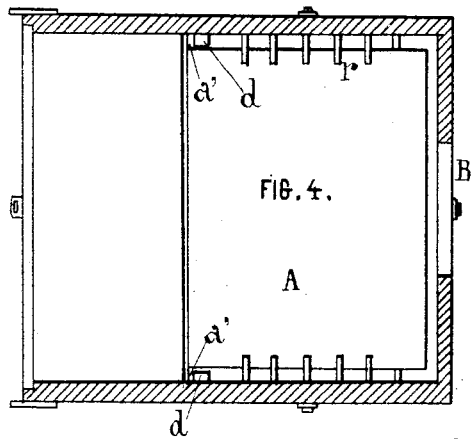
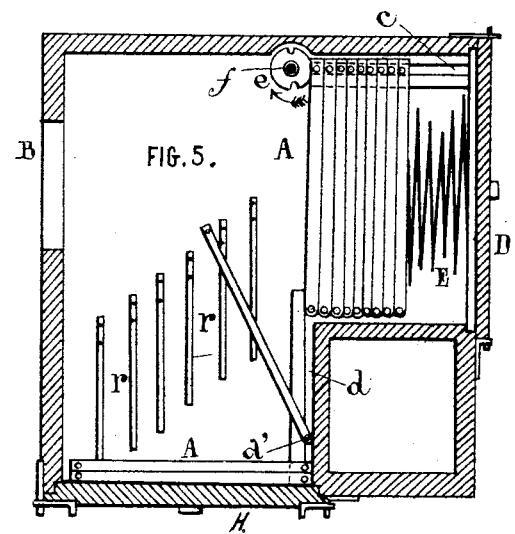
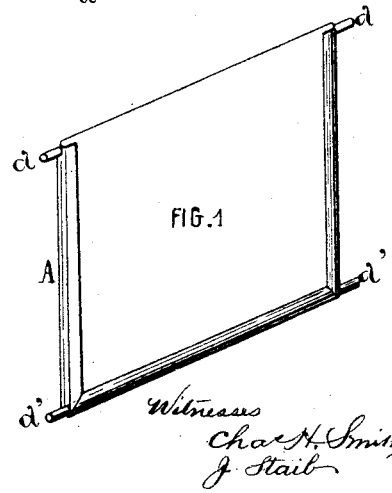
Inventor
Louis Lumiere
per Lemuel W. Serrell
Atty
Witnesses
Chas. H. Smith
J. Staib

UNITED STATES PATENT OFFICE.

LOUIS LUMIÉRE, OF LYONS, FRANCE.

PHOTOGRAPHIC APPARATUS.

SPECIFICATION forming part of Letters Patent No. 444,535, dated January 13, 1891.

Application filed July 19, 1890. Serial No. 359,258. (No model.) Patented in England May 6, 1890, No. 7,010, and in France August 7, 1890, No. 205,105.

*To all whom it may concern:*

Be it known that I, LOUIS LUMIÉRE, a citizen of the Republic of France, residing at Lyons, France, have invented an Improvement in Photographic Apparatus, of which the following is a specification.

Letters Patent for this invention have been issued to me in France under date as granted August 7, 1890, No. 205,105, and in Great Britain, dated May 6, 1890, No. 7,010.

This invention applies particularly to photographic apparatus for the use of travelers.

It has for its object to present successively and at will behind the objective a certain number of plates inclosed beforehand in the apparatus, and to store them away in the bottom of the apparatus as soon as they have been used, from which place they are only taken in the dark-room. This object is obtained by a very simple manipulation from the outside of the camera.

The accompanying drawings show this system. Figure 1 is a perspective view of a plate-holder. Fig. 2 is a vertical longitudinal section of the camera as the plates are being inserted. Fig. 3 is a cross-section of the box. Fig. 4 is a sectional plan view, and Fig. 5 is a vertical longitudinal section with the camera-box adapted to use.

The plates are placed in sheet-iron frames A, Fig. 1, with plain closed back, the edges being bent over on three sides. The plate is introduced at the upper edge. Each of these frames is provided with four small studs $a\ a'$ in line with the upper and lower edge. These frames could be made from any other material than sheet-iron.

This camera has an opening at the back large enough for the introduction of the frame loaded with the plates. They are placed in there in the following manner: The frame is held in the hand and the two upper studs $a\ a$ are introduced into two horizontal grooves $c\ c$ at the upper part of the camera, Fig. 2, and the frame is allowed to hang vertically, the plate being toward the objective B. When the first frame is in place, it rests by its lower studs against the ribs $b$ above two vertical grooves $d\ d$. The studs $a\ a$ on the upper part of the frame fit in two notches of the small disks $e\ e$, mounted on a cross-shaft $f$, provided on the outside with a button or crank $g$. The other frames are placed behind the first one and are suspended by the pins $a$ in the horizontal grooves $c$. If the desired number of frames has been introduced, the opening in the camera is closed by the door D, provided with bolts or any other kind of lock to close the same light-tight, and this door is provided in the center with a helical spring E, which presses against the last frame, as seen in Fig. 5. A picture can now be taken on the first plate, and it is then taken out of the way in the following manner: Turning the button $g$ in the direction of the arrow, the notches in the disks $e\ e$ are lowered and finally drop the frame, which is guided by the lower studs $a'$, sliding in the vertical grooves $d$, Fig. 5. The second frame presses against the first one to take its place, and thereby makes it fall over to lie horizontally on the bottom H of the camera. By turning the button $g$ still farther another notch is presented for the upper studs of the second frame and the second plate is now ready to receive an exposure, after which it is laid in the bottom of the camera by the operation already described.

To ease the fall of the plates to the bottom of the camera, I provide springs $r\ r$ on the sides, which springs rub against the edges of the frames. These springs have also for their object to hold the frames against the bottom of the camera when it is turned over or shipped. The only thing to be done, therefore, after the camera is prepared is to turn the button $g$ a fraction of a turn determined by the number of notches in the disk $e$ for the purpose of taken out of the way the plate that has received an exposure and put in its place another for the following operation. At the proper time the frames and plates are taken out through the bottom H, which is removable.

By bringing certain marks on the button $g$ opposite a certain fixed point this button can always be stopped in the proper position. To facilitate matters, a pawl-and-ratchet movement may be applied, so as to prevent a movement backward. By placing only one notch on each disk a crank could be used which would always stop at a fixed point.

In some instances I connect the button or the crank $g$ with the shutter in such a way that the shutter is first set and then released when the plate is in place. Thus a number of instantaneous views can be obtained by the simple movements of the button $g$ at more or less short intervals.

I claim as my invention—

1. The combination, with the camera-box, of the plate-holders A, having pivot-pins projecting at the corners, the guides or ribs inside the box having slots for receiving such pivots, and a shaft and notched disks for moving the plate-holders in succession, substantially as specified.

2. The plate-holder having projecting pivot-pins, in combination with a camera-box having ribs with intervening grooves for the pins, a shaft and notched disks for moving the plates in succession, openings and doors in the bottom and back of the box for introducing and removing the plates, substantially as specified.

3. The plate-holder having projecting pivot-pins, in combination with a camera-box having ribs with intervening grooves for the pins, a shaft and notched disks for moving the plates in succession, openings and doors in the bottom and back of the box for introducing and removing the plates, and the springs $r$ at the inner surfaces of the box, substantially as specified.

The foregoing specification of my improvement in photographic apparatus signed by me this 25th day of June, 1890.

LOUIS LUMIÉRE.

Witnesses:
   WM. RABBILLAND,
   JULES LÉGNICETTE.